J. J. LEWIS.
Ice-Creepers.

No. 198,492.   Patented Dec. 25, 1877.

Witnesses:
P. C. Dieterich
Frank H. Duffy

Inventor:
James J. Lewis
Per C. H. Watson & Co. Attorneys

UNITED STATES PATENT OFFICE.

JAMES J. LEWIS, OF NEW YORK, N. Y.

IMPROVEMENT IN ICE-CREEPERS.

Specification forming part of Letters Patent No. 198,492, dated December 25, 1877; application filed November 27, 1877.

*To all whom it may concern:*

Be it known that I, JAMES J. LEWIS, of New York city, in the county of New York and State of New York, have invented certain new and useful Improvements in Ice-Creepers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to an improvement in ice-creepers, having for its object to improve the construction and simplify the manufacture of the same; and it consists in the arrangement of parts, as will be hereinafter more fully set forth.

Figure 1:
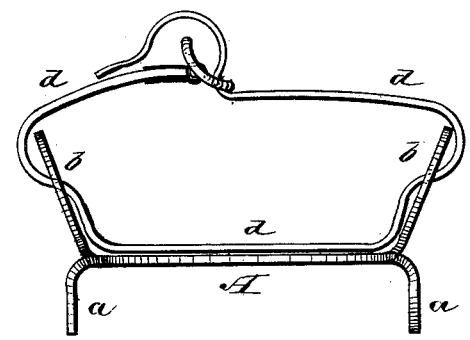
Figure 2:
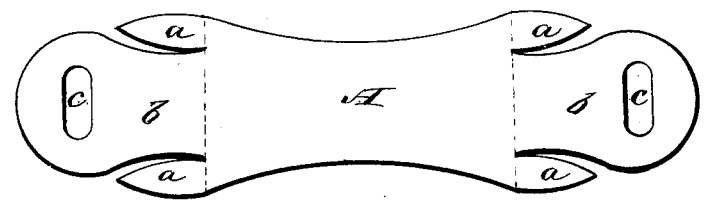

In the annexed drawings, Figure 1 is a side elevation of the creeper complete, and Fig. 2 is a view of the plate before the prongs are turned down and the wings turned up.

$a$ represents the prongs or points; $b$, the wings or braces, and A the support for the foot. In the upper part of the wings $b$ are made suitable holes $c$ to receive the strap $d$.

The merits of my invention are, that the creeper is stamped from one piece of metal, in the shape shown at Fig. 2, and parts $a$ turned downward and parts $b$ upward, as shown at Fig. 1, thus dispensing with the attaching of spikes, &c., as is now the custom; that the wings $b$ form braces to hold the creeper firmly on the foot, and prevent its turning to one side when the strap is adjusted, and the strap $d$ passes through the openings $c$, which are made for that purpose, and passes down under the boot or shoe, so that one continuous strap may be used, and, passing loosely through the openings $c$, it will always adjust itself to the proper position.

Having thus fully described the invention, what is claimed as new, and desired to be secured by Letters Patent, is—

The ice-creeper herein described, having prongs $a$, wings $b$, tread A, and the opening $c$, in combination with the loose-fitted strap $d$, passing through the openings $c$, constructed and arranged substantially as and for the purpose set forth.

In testimony that I claim the foregoing as my own I have hereto affixed my signature in presence of two witnesses.

JAMES J. LEWIS.

Witnesses:
 WILL S. BAGG,
 ANTON HAGENBÜCKLE.